United States Patent
Golley et al.

(10) Patent No.: US 6,537,363 B1
(45) Date of Patent: *Mar. 25, 2003

(54) KAOLIN PIGMENTS, THEIR PREPARATION AND USE

(75) Inventors: Christopher R. L. Golley, Sandersville, GA (US); Daniel John Panfil, Milledgeville, GA (US); Harry Vincent Brown, Jr., Sandersville, GA (US); John Claude Husband, Cornwall (GB)

(73) Assignee: Imerys Pigments, Inc., Roswell, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/937,729

(22) Filed: Dec. 20, 2001

Related U.S. Application Data

(60) Provisional application No. 60/127,380, filed on Apr. 1, 1999.

(51) Int. Cl.[7] .......................... C04B 14/00; C04B 14/10
(52) U.S. Cl. ..................... 106/486; 106/484; 106/485; 106/487; 106/488; 106/416; 423/432
(58) Field of Search ................................ 106/484–488, 106/416; 423/432

(56) References Cited

U.S. PATENT DOCUMENTS

| | | | |
|---|---|---|---|
| 2,158,987 A | 5/1939 | Maloney | 19/68 |
| 3,034,859 A | 5/1962 | Gunn et al. | 23/110 |
| 3,171,718 A | 3/1965 | Gunn et al. | 23/110 |
| 3,526,768 A | 9/1970 | Rai et al. | |
| 3,615,806 A | 10/1971 | Torock | 106/288 |
| 3,635,662 A | 1/1972 | Lyons | |
| 3,798,044 A | 3/1974 | Whitley et al. | |
| 4,125,411 A | 11/1978 | Lyons | 106/291 |
| 4,176,148 A | 11/1979 | Magder et al. | |
| 4,183,991 A | 1/1980 | Smiley et al. | |
| 4,198,333 A | 4/1980 | von Bonin et al. | |
| 4,221,697 A | 9/1980 | Osborn et al. | |
| 4,225,496 A | 9/1980 | Columbus et al. | |
| 4,227,920 A | 10/1980 | Chapman et al. | |
| 4,233,199 A | 11/1980 | Abolins et al. | |
| 4,234,469 A | 11/1980 | Ohta et al. | |
| 4,241,142 A | 12/1980 | Kaliski et al. | |
| 4,243,574 A | 1/1981 | Manwiller | |
| 4,250,077 A | 2/1981 | van Bonin et al. | |
| 4,251,576 A | 2/1981 | Osborn et al. | |
| 4,298,711 A | 11/1981 | Moulson et al. | |
| 4,311,635 A | 1/1982 | Pearson | |
| 4,359,497 A | 11/1982 | Magder et al. | |
| 4,381,948 A | 5/1983 | McConnell et al. | |
| 4,409,344 A | 10/1983 | Moulson et al. | |
| 4,414,352 A | 11/1983 | Cohen et al. | |
| 4,427,450 A | 1/1984 | Kostansek | |
| 4,467,057 A | 8/1984 | Dieck et al. | |
| 4,543,287 A | 9/1985 | Briggs et al. | |
| 4,546,126 A | 10/1985 | Breitenfellner et al. | |
| 4,582,866 A | 4/1986 | Shain | |

(List continued on next page.)

FOREIGN PATENT DOCUMENTS

| | | |
|---|---|---|
| DE | 2 241 577 | 3/1973 |
| DE | 24 49 656 | 12/1975 |
| DE | 26 58 814 | 2/1978 |
| DE | 28 18 954 | 11/1978 |
| DE | 27 39 620 | 3/1979 |
| DE | 30 12 235 | 10/1980 |
| DE | 30 47 269 | 7/1982 |
| DE | 36 32 606 | 4/1987 |
| DE | 35 36 371 | 5/1987 |
| DE | 35 40 524 | 5/1987 |
| DE | 37 50 864 | 4/1988 |
| DE | 38 84 605 | 8/1988 |
| DE | 43 01 730 | 7/1993 |
| DE | 42 13 746 | 10/1993 |
| DE | 100 10 941 | 9/2001 |
| EP | 0 001 066 | 4/1980 |
| EP | 0 026 075 | 4/1981 |
| EP | 0 054 424 | 6/1982 |
| EP | 0 132 094 | 1/1985 |
| EP | 0 132 228 | 1/1985 |
| EP | 0 160 777 | 11/1985 |
| EP | 0 163 427 | 12/1985 |
| EP | 0 217 626 | 4/1987 |
| EP | 0 222 138 | 5/1987 |
| EP | 0 222 298 | 5/1987 |
| EP | 0 239 986 | 10/1987 |
| EP | 0 245 553 | 11/1987 |
| EP | 0 262 649 | 4/1988 |

(List continued on next page.)

OTHER PUBLICATIONS

Brochure: "Kaopaques Delaminated Aluminum Silicates for Paint Systems," Georgia Kaolin Co., 433 N. Broad Street, Elizabeth, NJ 07207, Oct. 1975.

Burgess, Malcolm, "Kaolin, a Glaciers Gift to Georgia," 1985.

Clay Minerals Society Homepage, http://cms/lanl.gov/instruct.html, "Instructions for Authors, Clays and Clay Minerals," *Instructions for Authors*, p. 4 of 5.

(List continued on next page.)

*Primary Examiner*—Mark L. Bell
*Assistant Examiner*—Shalie Manlove
(74) *Attorney, Agent, or Firm*—Finnegan, Henderson, Farabow, Garrett & Dunner, L.L.P.

(57) ABSTRACT

A pigment product suitable for use in a coating composition to provide a gloss coating on paper, the pigment product comprising a processed particulate kaolin produced from a naturally platy kaolin clay having a particle size distribution such that about 50% to 60% by weight of the particles have an esd less than 2 $\mu$m and less than 25% by weight of the particles have an esd less than 0.25 $\mu$m and a shape factor of at least 15. This platy clay can be blended with b-fraction clay component. In processing, the crude kaolin is ground to a shape factor greater than 50 to produce even greater "platy" clay. The pigment product has a particle size distribution such that at least 80% by weight of the particles have an esd less than 2 $\mu$m and greater than 12% and less than 35% by weight of the particles have an esd less than 0.25 $\mu$m and whose surface area is greater than 12 $m^2/g$ when measured by the BET method.

48 Claims, No Drawings

U.S. PATENT DOCUMENTS

| | | | |
|---|---|---|---|
| 4,584,333 | A | 4/1986 | Prigent et al. |
| 4,708,975 | A | 11/1987 | Shain |
| 4,795,776 | A | 1/1989 | Milner |
| 4,820,761 | A | 4/1989 | Saito et al. |
| 4,873,116 | A | 10/1989 | Ancker |
| 4,888,315 | A | 12/1989 | Bowman et al. |
| 4,918,127 | A | 4/1990 | Adur et al. |
| 4,943,324 | A | 7/1990 | Bundy et al. |
| 4,966,638 | A | 10/1990 | Mudgett |
| 4,981,521 | A | 1/1991 | Bettacchi et al. |
| 5,085,707 | A | 2/1992 | Bundy et al. |
| 5,112,782 | A | 5/1992 | Brown et al. |
| 5,128,606 | A | 7/1992 | Gate et al. .................. 324/71.4 |
| 5,167,707 | A | 12/1992 | Freeman et al. |
| 5,168,083 | A | 12/1992 | Matthews et al. |
| 5,169,443 | A | 12/1992 | Willis et al. |
| 5,294,654 | A | 3/1994 | Hellstern-Burnell et al. |
| 5,332,493 | A | 7/1994 | Ginn et al. |
| 5,364,899 | A | 11/1994 | Watanabe et al. |
| 5,411,587 | A | 5/1995 | Willis et al. |
| 5,416,151 | A | 5/1995 | Tanaka |
| 5,439,558 | A | 8/1995 | Bergmann et al. |
| 5,454,865 | A | 10/1995 | Ginn et al. |
| 5,516,829 | A | 5/1996 | Davis et al. |
| 5,522,924 | A | 6/1996 | Smith et al. |
| 5,573,946 | A | 11/1996 | Haxell et al. |
| 5,578,659 | A | 11/1996 | Anada et al. |
| 5,624,488 | A | 4/1997 | Forbus et al. |
| 5,645,635 | A | 7/1997 | Behl et al. |
| 5,685,900 | A | 11/1997 | Yuan et al. |
| 5,707,912 | A | 1/1998 | Lowe et al. |
| 5,735,946 | A | 4/1998 | Bloodworth et al. |
| 5,749,958 | A | 5/1998 | Behl et al. |
| 5,810,998 | A | 9/1998 | Arrington-Webb et al. |
| 5,846,309 | A | 12/1998 | Freeman et al. |
| 5,879,512 | A | 3/1999 | McGenity et al. .......... 162/135 |
| 5,948,156 | A | 9/1999 | Coutelle et al. |
| 6,031,036 | A | 2/2000 | Rosenquist et al. |
| 6,149,723 | A | 11/2000 | Pruett et al. |
| 6,186,335 | B1 | 2/2001 | Arrington-Webb et al. |
| 6,262,161 | B1 | 7/2001 | Betso et al. |
| RE37,385 | E | 9/2001 | Okada et al. |
| 6,402,286 | B1 | 6/2002 | Yuan et al. |

FOREIGN PATENT DOCUMENTS

| | | |
|---|---|---|
| EP | 0 274 888 | 7/1988 |
| EP | 0 341 981 | 11/1989 |
| EP | 0 352 714 | 1/1990 |
| EP | 0 456 363 | 11/1991 |
| EP | 0 475 434 | 3/1992 |
| EP | 0 528 078 | 2/1993 |
| EP | 0 586 904 | 3/1994 |
| EP | 0 588 239 | 3/1994 |
| EP | 0 589 461 | 3/1994 |
| EP | 0 596 442 | 5/1994 |
| EP | 0 691 375 | 1/1996 |
| EP | 0 824 130 | 2/1998 |
| EP | 1 088 852 | 4/2001 |
| FR | 2 150 953 | 4/1973 |
| FR | 2 273 040 | 12/1975 |
| FR | 2 359 874 | 2/1978 |
| FR | 2 389 645 | 12/1978 |
| FR | 2 452 511 | 10/1980 |
| FR | 2 558 168 | 7/1985 |
| FR | 2 774 689 | 8/1999 |
| GB | 1032436 | 6/1966 |
| GB | 1118723 | 7/1968 |
| GB | 1375057 | 11/1974 |
| GB | 1469028 | 3/1977 |
| GB | 1493393 | 11/1977 |
| GB | 1513657 | 6/1978 |
| GB | 1597213 | 9/1981 |
| GB | 2223758 | 4/1990 |
| GB | 2240398 | 7/1991 |
| GB | 2310215 | 8/1997 |
| JP | 51005383 | 1/1976 |
| JP | 53016063 | 2/1978 |
| JP | 54010394 | 1/1979 |
| JP | 54047751 | 4/1979 |
| JP | 55131024 | 10/1980 |
| JP | 59074152 | 4/1984 |
| JP | 60023448 | 2/1985 |
| JP | 60038455 | 2/1985 |
| JP | 60084364 | 5/1985 |
| JP | 60161443 | 8/1985 |
| JP | 60235858 | 11/1985 |
| JP | 62116667 | 5/1987 |
| JP | 62232452 | 10/1987 |
| JP | 63132964 | 6/1988 |
| JP | 63175047 | 7/1988 |
| JP | 02-018362 | 1/1990 |
| JP | 02034653 | 2/1990 |
| JP | 02045551 | 2/1990 |
| JP | 04122752 | 4/1992 |
| JP | 05262974 | 10/1993 |
| JP | 06016918 | 1/1994 |
| JP | 06065490 | 3/1994 |
| JP | 06502684 | 3/1994 |
| JP | 06145442 | 5/1994 |
| JP | 07502068 | 3/1995 |
| JP | 08022945 | 1/1996 |
| JP | 10114854 | 5/1998 |
| JP | 2000345032 | 12/2000 |
| JP | 2001098149 | 4/2001 |
| WO | WO 80/01167 | 6/1980 |
| WO | WO 80/02430 | 11/1980 |
| WO | WO 88/05804 | 8/1988 |
| WO | WO 90/11605 | 10/1990 |
| WO | WO 93/04119 | 3/1993 |
| WO | WO 94/07956 | 4/1994 |
| WO | WO 97/32934 | 9/1997 |
| WO | WO 97/34956 | 9/1997 |
| WO | WO 9837152 | 8/1998 |
| WO | WO 98/56860 | 12/1998 |
| WO | WO 98/58613 | 12/1998 |
| WO | WO 99/41309 | 8/1999 |
| WO | WO 99/51815 | 10/1999 |
| WO | WO 99/58613 | 11/1999 |
| WO | WO 00/05311 | 2/2000 |
| WO | WO 00/59840 | 10/2000 |
| WO | WO 00/59841 | 10/2000 |
| WO | WO 00/66657 | 11/2000 |
| WO | WO 01/12708 | 2/2001 |
| WO | WO 01/46307 | 6/2001 |
| WO | WO 01/66627 | 9/2001 |
| WO | WO 01/66635 | 9/2001 |

OTHER PUBLICATIONS

Jepson, W.P., "Kaolins, their properties and uses," *Phil. Trans. R. Soc. Lond.*, A311, 411–432, 1984.

Swan, A., "Realistic paper tests for various printing processes," *Printing Technology*, 13(1), 9–22, Apr., 1969.

Abstract, Japanese Patent No. 08012886A, publication date Jan. 1996.

Abstract, German Patent No. 3679147.

Abstract, German Patent No. 3689760.

Abstract, German Patent No. 3565272.

Abstract, German Patent No. 3466547.

KAOLIN PIGMENTS, THEIR PREPARATION AND USE

This application is a national phase application based on international application number PCT/US00/08466, filed Mar. 31, 2000, and claims the benefit of provisional application No. 60/127,380, filed Apr. 1, 1999, the contents of which are incorporated herein by reference.

1. Field of the Invention

The present invention relates to pigment products, and their production and use in coating compositions for preparing gloss coated paper, especially lightweight and ultralightweight coated paper. More particularly, the invention relates to paper coating pigments made from a crude feed comprising a naturally platy clay having a particle size distribution such that greater than 50% by weight of the particles have an esd less than 2 microns and less than 25% by weight of the particles have an esd less than 0.25 microns and a shape factor of 15 or more.

2. Background of the Invention

Paper coating compositions are generally prepared by forming a fluid aqueous suspension of pigment material together with a hydrophilic adhesive and other optional ingredients.

Lightweight coated, or LWC, paper is generally coated to a weight of from about 5 g·m$^{-2}$ to about 13 g·m$^{-2}$ on each side, and the total grammage, or weight per unit area of the coated paper is generally in the range of from about 49 g·m$^{-2}$ to about 65 g·m$^{-2}$. The coating may conveniently be applied by means of a coating machine including a short dwell time coating head, which is a device in which a captive pond of coating composition under a slightly elevated pressure is held in contact with a moving paper web for a time in the range of from 0.0004 second to 0.01 second, before excess coating composition is removed by means of a trailing blade. However, other types of coating apparatus may also be used for preparing lightweight coated paper. LWC paper is generally used for printing magazines, catalogues and used for preparing lightweight coated paper. LWC paper is generally used for printing magazines, catalogues and advertising or promotional material. The coated paper is required to meet certain standards of surface gloss and smoothness. For example, the paper is generally required to have a gloss value of at least about 32, and up to about 60, TAPPI units, and a Parker Print Surf value in the range of from about 0.5 to about 1.6 μm.

Ultra lightweight coated, or ULWC, paper is sometimes otherwise known as light lightweight coated, or LLWC, paper and is used for catalogues and for advertising and promotional material sent through the mail to reduce mailing costs. The coating weight is generally in the range of from 5 g·m$^{-2}$ to 7 g·m$^{-2}$ per side. The grammage is generally in the range of from about 35 g·m$^{-2}$ to about 48 g·m$^{-2}$.

Rotogravure printing generally involves the use of an engraved or etched cylinder as an image carrier. Image areas are etched or engraved below non-image areas in the form of tiny sunken cells. The cylinder is immersed in ink, and the excess ink is scraped off by a blade. When the substrate contacts the printing cylinder, ink transfers, forming the image.

Offset printing is an indirect printing method in which the inked image on a press plate is first transferred to a rubber blanket that, in turn, "offsets" the inked impression to a press sheet.

A very important white inorganic pigment for use in preparing coating compositions for the manufacture of LWC and ULWC papers for rotogravure or offset printing is kaolin obtained from kaolin clay. Large deposits of kaolin clay exist in Devon and Cornwall, England and in the States of Georgia and South Carolina, United States of America. Important deposits also occur in Brazil, Australia, and in several other countries.

Kaolin clay, also referred to as china clay or hydrous kaolin, consists predominantly of mineral kaolinite ($Al_2Si_2O_5(OH)_4$), an hydrous aluminum silicate, together with small proportions of various impurities.

Some of these impurities, such as fine ferruginous or titaniferous impurities impart undesirable color to the clay. Other impurities, such as mica, smectite, vermiculite, hydrobiotite, mixed or layered illite-smectite or mixed layers of clay minerals generally have an undesirable effect on the rheology of the kaolin clay-water viscosity. In order to eliminate or to reduce these impurities, the kaolin crude is subject to one or several beneficiation steps, most of which are well known to the mineral processing industry.

Kaolinite exists in the form of hydrous aluminosilicate crystals in the shape of thin hexagonal plates or booklets of platelets called "stacks". The individual plates may have mean diameters of 1 μm or less, but kaolinite particles in the form of stacks of plates may have an equivalent spherical diameter ("esd") of 10 μm or more. Generally speaking, kaolin clay particles which have an esd of 2 μm or more are in the form of stacks of kaolinite plates, rather than individual plates.

As long ago as 1939, Maloney disclosed in U.S. Pat. No. 2,158,987 that the finish, or gloss, of a clay coated paper is greatly improved if the clay, before incorporation in the coating composition, is treated so that a large percentage, for example 80% by weight or more, of the clay particles have a size in the range of 0.1 μm to 2 μm. In order to increase the proportion of fine particles in the raw kaolin, the raw kaolin may, according to the disclosure in U.S. Pat. No. 2,158,987 be subjected, before the centrifuging step, to a grinding or delaminating operation in which a suspension containing from about 50% to about 75% by dry weight of kaolin and a dispersing agent is subjected to pebble milling. When the kaolin from the finer fraction is recovered, mixed with a suitable paper coating binder, and applied to the surface of a base paper, a coating of good gloss and color is obtained.

Various pigment products which are made using the principles described by Maloney in U.S. Pat. No. 2,158,987 are commercially available and provide good gloss and smoothness in coated papers, especially for LWC and ULWC paper. For example, a pigment product available from Imerys Minerals Ltd, formerly ECC International Ltd., a British corporation, and recommended for gloss coatings of LWC consists of a refined English kaolin product having a particle size distribution, "psd", such that 89% by weight of the particles have an esd less than 2 μm, 74% by weight of the particles have an esd less than 1 μm and 25% by weight of the particles have an esd less than 0.25

A kaolin product of high shape factor is considered to be more "platy" than a kaolin product of low shape factor. "Shape factor" as used herein is a measure of an average aspect ratio value (on a weight average basis) of the ratio of mean particle diameter to particle thickness for a population of particles of varying size and shape as measured using the electrical conductivity method and apparatus described in GB-A-2,240,398/U.S. Pat. No. 5,1286,06/EP-A-0,528,078 and in U.S. Pat. No. 5,516,617 and using the equations derived in these patent specifications. "Mean particle diameter" is defined as the diameter of a circle which has the same area as the largest face of the particle. In the measurement method described in GB-A-2240398/U.S. Pat. No. 5,128,606/EP-A-0528078, the electrical conductivity of a fully dispersed aqueous suspension of the particles under test is caused to flow through an elongated tube. Measurements of the electrical conductivity are taken between (a) a pair of electrodes separated from one another along the longitudinal axis of the tube, and (b) a pair of electrodes separated from one another across the transverse width of the tube, and using the difference between the two conductivity measurements the shape factor of the particulate material under test is determined.

The kaolin deposits in England are of primary kaolin, whilst those in the USA are of both the primary and the sedimentary (secondary) types. Kaolin was formed in geological times by the hydrothermal decomposition or by the weathering of the feldspar and mica components of granite and feldspathic metamorphic rocks, and primary kaolin is that which is obtained directly from the granite matrix in which it was originally formed. On the other hand, secondary kaolin, also known as sedimentary kaolin, has been washed out of the original granite matrix in geological times and has been deposited in an area remote from the site in which it was originally formed. Secondary kaolin deposits tend to have a higher proportion of fine particles, with an esd smaller than about 2 $\mu$m, because the kaolin has undergone a certain amount of natural grinding and sorting during the course of its transport from its site of origin to its site of final deposition. Jepson (Jepson, W B, "Kaolins: their properties and uses", Phil. Trans. R. Soc. Lond., A311, 1984, pp 411–432) has shown that a sample of an English primary kaolin clay, which has been subjected to a particle size separation such that substantially all particles having an esd larger than 5 $\mu$m have been removed, will comprise particles in the form of roughly hexagonal plates having diameters in the range of from about 8 $\mu$m down to about 0.1 $\mu$m, with shape factors which will vary from the coarsest particles to the finest particles the average shape factor being from about 20 to about 30. On the other hand, a sample of secondary kaolin clay from Georgia, USA, which has been subjected to a particle size separation such that substantially all particles having an esd larger than 5 $\mu$m have been removed, will typically comprise particles which more nearly conform to a regular hexagonal shape and which had diameters of 0.1 $\mu$m and above, but a generally finer distribution of diameters than is the case with the English kaolin. The shape factor of the particles of the Georgia, USA kaolin will lie within the range of from about 6 to about 10, but there will be little variation in the shape factor with particle diameter.

The aforesaid kaolin products, as well as commercially available kaolin products, generally are produced from a kaolin crude which is mined from the secondary clay deposit beds which have been selected to have good rheological characteristics. In the past, the kaolin clay mineral-producing industries have avoided using other clay beds in the crude ores because they were considered inferior due to rheology problems. The rheology problems are considered to be associated with platiness and higher levels of impurities. In general, the crude ore in the normally rejected zones of the clay beds is a naturally platy clay having a shape factor of greater than 15 which when processed, has a higher viscosity and therefore "poor" viscosity compared to the crude ore taken from normally selected zones.

SUMMARY OF THE INVENTION

A first aspect of the invention provides a kaolin clay pigment made from a naturally platy crude clay which generally is obtained from the normally rejected zones of a sedimentary kaolin bed, such as those in Washington County, Georgia, U.S.A. The crude clay generally will have a shape factor of at least 15. The particle size distribution of this crude clay is such that greater than about 50% by weight, and in one embodiment even greater than about 60% by weight, of the particles have an esd less than 2 microns and not more than 25% by weight of the particles have an esd less than 0.25 microns.

According to a second aspect of the invention, there is provided a method for producing a pigment according to the first aspect. This method comprises the steps of:

(a) mixing a raw kaolin clay crude, comprising a naturally platy clay from a sedimentary deposit and having a shape factor of at least 15 and having a particle size distribution such that greater than 50% by weight of the particles have an esd less than 2.0 microns and less than 25% by weight of the particles have an esd less than 0.25 microns, with water to form an aqueous suspension containing about 20% to about 70% solids of kaolin on a dry weight basis;

(b) diluting to 40% solids of kaolin on a dry weight basis and then subjecting the suspension to attrition grinding using a particulate grinding medium for a time sufficient to dissipate in the suspension an optimum amount of energy to impart an average shape factor to the kaolin clay particles of at least 50;

(c) separating the suspension of ground kaolin clay from the particulate grinding. medium;

(d) subjecting the suspension of step (c) to a particle size classification step; and (e) dewatering the suspension of ground kaolin clay classified in step (d) to recover a pigment product therefrom.

In step (a) the formed aqueous suspension preferably contains about 60% solids of kaolin on a dry weight basis.

In step (e) and as a result of step (d), the kaolin clay particles may have a particle size distribution such that at least 80%, preferably between 85% to 95% by weight, and most preferably, 88% to 92% by weight, of the particles have an esd less than 2 microns and less than 35% preferably, from about 20% to about 35%, and most preferably, about 25% to about 35%, by weight of the particles have an esd less than 0.25 microns.

In step (b), the energy dissipated in the suspension may range from about 20 kWh to about 100 KWh of energy per ton of kaolin present on a dry weight basis.

Beneficiation steps to improve clay brightness, such as magnetic separation, ozone, reduced-acid leaching, flotation, or selective flocculation, may be performed on the clay suspension or slurry prior to or after the attrition grinding in step (b).

The pigment product of the invention preferably has a surface area greater than 12 $m^2/g$, more preferably between 15 $m^2/g$ to 20 $m^2/g$ when measured by the BET method.

Since the pigment products of the invention are typically 80%–95% by weight finer than 2 micrometers, and the surface area may be greater than 15 $m^2/g$ when measured by the BET method, they can be classified as No. 1 kaolin clay pigments. In step (a) the shape factor of the naturally platy clay prior to any delamination or grinding thereof is at least 15 and, preferably, is greater than 25, and most preferably is greater than 30. As a result of the shape factor produced in step (b) being at least 50, the kaolin clay particles finer than 2 micrometers are extremely platy.

A second embodiment of the invention provides for a blend of kaolin clays to produce a pigment product. For example, the blend would comprise about 80% of a naturally platy kaolin crude as described herein having a shape factor of at least 15 and preferably greater than 25, and about 20% of a "blocky" kaolin clay having a shape factor less than 10. This "blocky" clay may be a b-fraction kaolin clay component, which generally is the discarded fraction in a centrifuge or classification operation in that it is considered to be "too coarse" for paper coating applications. This blend would be subjected to step (a) through step (e) in accordance with the method of the invention and the second aspect thereof.

The pigment product of the two embodiments of the invention has shown to give greater improvement in sheet brightness, opacity, and gloss as compared to standard products in starch containing binder systems. Pigments of the invention are particularly useful for use in compositions for coating lightweight (LWC) and ultra-lightweight (ULWC) printed-paper.

DETAILED DESCRIPTION OF THE INVENTION

The novel hydrous kaolin pigments of the invention are adapted for coating LWC and ULWC paper adapted to be printed by offset and roto gravure and comprise a major amount of platy kaolin particles where the platiness of the kaolin particles is defined in terms of a "high" shape factor, that is, the average shape factor of the particles of the pigment is at least 50, preferably 60.

The pigment product according to a first aspect of the present invention may be obtained by treating a raw particulate hydrous naturally platy kaolin mineral obtained from the normally rejected (poor viscosity) zones of the sedimentary or secondary type of kaolin, such as that which occurs in Georgia, USA.

In the Georgia deposits, it is not common practice to utilize the naturally platy clays because the rheology (viscosity) is poor compared to the blocky clays generally available in the deposits. When a "naturally platy" clay is referred to in the invention, it is meant that the clay, generally having a shape factor of at least 15, will naturally grind to a very high shape factor, generally greater than about 50, with relatively low amounts of energy, from about 20 to about 100 KWh/ton of clay, more about which is discussed hereinbelow.

The novel kaolin pigments resulting from step (e) of the method according to the first aspect of the invention may have the following characteristics:

Particle Size Distribution

At least 80% by weight, preferably 85% to 95% by weight, and most preferably 88% to 92% by weight, finer than 2 micrometers; and 58% by weight, preferably 50% to 60% by weight, and, most preferably 53% to 58% by weight, finer than 0.5 micrometers;

38% by weight, preferably 30% to 40% by weight, finer than 0.3 micrometers;

less than 35% by weight, most preferably, 25% to 30% by weight, finer than 0.25 micrometers.

Average particle size (such as $d_{50}$) ranging from about 0.30 to about 0.60 micrometers, and, preferably, from about 0.35 to about 0.52, and most preferably, 0.38 to about 0.45 micrometers.

Surface Area

BET surface area is preferably greater than 12 $m^2/g$, more preferably is greater than 15 $m^2/g$, and even more preferably is greater than 16 $m^2/g$.

Solids Content

The clay-water slurry weight percent solids of the pigment product of the invention may be at least 50% by weight, preferably ranging from 61.0% to about 64.0% by weight of kaolin clay particles in dry weight form. The clay content of a coating composition comprising the pigment product of the invention may range from about 65% by weight to about 90% by weight of the total dry solids.

Surface area is a property related to particle size of kaolins although surface area alone does not correlate directly with particle size. Surface area is expressed in terms of square meters of area per gram of a material and is frequently measured by the BET method using nitrogen as adsorbate.

The starting crude kaolin useful in the invention is naturally platy kaolin. Such crudes contain particles having a shape factor equal to or greater than 15, preferably, equal to or greater than 25. With a shape factor less than 15, the crude is composed substantially of booklets. A shape factor above 30 indicates that the clay is composed substantially of thin platelets.

The pigment product preferably has a particle size distribution "psd" such that at least 80%, preferably 85% to 95% by weight, and most preferably 88% to 92% by weight of the particles have an esd smaller than 2 $\mu$m and less than 35% by weight of the particles have an esd smaller than 0.25 $\mu$m. Desirably, at least 70%, preferably at least 72% by weight have an esd less than 1 $\mu$m. As will be appreciated by those skilled in the art, the psd of a particulate product such as the pigment product according to the present invention may be determined by measuring the speeds at which dispersed particles of the particulate product under test, sediment through a standard dilute aqueous suspension using a SEDIGRAPH™ instrument, for example the SEDIGRAPH 5100, obtained from Micromeritics Corporation, USA. The size of a given particle is expressed in terms of the diameter of a sphere of equivalent diameter, which sediments through the suspension is expressed as the esd or esd, the parameter as referred to above. The SEDIGRAPH instruments measures and graphically records the percentage by weight of particles having esd less than a certain esd value versus esd.

According to the second aspect of the invention, the method provides grinding the particles of the naturally platy kaolin crude ore to a shape factor greater than 50. These natural platy kaolin clays in the invention generally will contain about 50–60% by weight of particles finer than 2 $\mu$m and less than 25% by weight of particles finer than 0.25 $\mu$m. The fine particles in these crudes, for example, the particles finer than 2 $\mu$m esd contain very fine booklets or fine individual particles. In the invention, attrition grinding is applied to the crude particles prior to a classification step in order to increase the number of fine individual platelets. That is, the shape factor is increased from about 15 to 25 to at least 50.

The method of the invention comprises the steps of:

(a) mixing a raw kaolin crude comprising a naturally platy clay having a shape factor of at least 15 and a particle size distribution such that greater than 50% by weight of the particles have an esd less than 2 microns and not more than 25% by weight of the particles have an esd less than 0.25 $\mu$m, with water to form an aqueous suspension containing about 60% solids of kaolin on a dry weight basis;

(b) diluting to 40% solids of kaolin on a dry weight basis and subjecting the suspension to attrition grinding using a particulate grinding medium for a time sufficient to dissipate in the suspension an optimum amount of energy to impart an average shape factor value to the kaolin clay particles of at least 50;

(c) separating the suspension of ground kaolin clay from the particulate grinding medium; and (d) subjecting the suspension of step (c) to a classification step;

(e) dewatering the suspension to a ground kaolin clay separation in step (d) to recover a pigment product therefrom.

Between steps (a) and (b), the clay slurry is degritted to remove coarse particles greater than 45 microns and the clay slurry is subjected to a high intensity magnetic separator to remove the iron-bearing minerals from the clay.

Typically, in step (a) the crude is initially crushed and then mechanically worked, for example, by blunging in water, preferably containing clay dispersant, such as one or more inorganic or organic agents well known in the art. In the invention, it is preferred to use a mixture of sodium hexametaphosphate and soda ash. Generally, the solids of the blunged clay are in the range of 20% to 65%, preferably from about 40% to 60% by weight of kaolin on a dry weight basis. The blunged clay slurry may be degritted by passing the slurry through sand boxes and a +325 mesh (U.S. standard) screen to remove to coarse (grit) particles larger than 45 microns. The slurry is then subjected to a high intensity magnetic separator to remove the iron-bearing minerals from the clay.

From the magnetic separator, and as described in step (b), the clay slurry is subjected to an attrition grinding step using a particulate grinding medium for a time sufficient to dissipate in the suspension enough energy to impart an average shape factor value to the particles of at least 50, which makes the naturally play clay crude even "platier".

The particulate grinding medium preferably has a specific gravity of 2 or more, and advantageously comprises grains of silica sand or similar media, the grains generally having diameters not larger than about 2 mm and not smaller than about 0.25 mm. Preferably, the amount of energy dissipated in the suspension of kaolin clay is in the range of from about 20 kWh to about 100 KWh of energy per ton of kaolin present on a dry weight basis. Typically, the amount of energy dissipated for the platy crudes used in the invention will range from about 25 kWh to about 50 kWh per ton of kaolin present on a dry weight basis.

After attrition grinding and as recited in step (b), the clay slurry may be passed through a particle size separator such as a conventional centrifuge to classify the clay to a particle size distribution.

The 2 micron content after attrition or sand grinding generally varies from batch to batch of kaolin crude, and therefore, a classification step is employed to: 1) ensure that the pigment product has consistent particle size; and 2) adjust the 2 micron content to a level needed for a desired performance of the pigment product.

In step (e), the suspension of ground kaolin may be dewatered in one of the ways well known in the art, such as filtration, centrifugation, evaporation and the like. Dewatering using a rotary vacuum filter is preferred. For example, use of a rotary vacuum filter may be made to form a cake (product slurry) having a water range of from about 35% to about 60% by weight. This cake may be mixed with a dispersing agent for the kaolin clay and thus converted into fluid slurry. This slurry of the kaolin clay may be dried. In one embodiment of the invention, the kaolin clay is thermally dried by introducing the fluid slurry of the kaolin clay into a spray drier and thereby transported in a substantially dry form.

Alternatively, the solids concentration may be raised by evaporation or spray dry back mixing a portion of the fluid slurry to raise the solids.

Between steps (d) and (e), the suspension may be subjected to a leaching process to remove iron oxides and other leachable colorant species to change the shade of the clay.

After the dewatering step (e), the solids content of the slurry may be raised to about 60%, or it may be lower or higher than 60%, by weight. This solids content represents "good" rheology for this kaolin product.

A further embodiment of the invention provides for a blend of kaolin clays. For example, the blend would comprise about 80% of a naturally platy kaolin crude as described hereinabove having a shape factor of at least 15 and preferably greater than 25, and about 20% of a "blocky" kaolin clay having a shape factor less than 10. This "blocky" clay may be a b-fraction kaolin clay component, which generally is discarded in a centrifuge or classification operation in that it is considered to be "too coarse" for paper coating applications. This blend would be subjected to step (a) through step (e) in accordance with the method of the invention and the second aspect thereof.

A second embodiment of the invention pertains to a blend of a naturally platey clay with a b-fraction kaolin clay component. This blend is such that the pigment has the desired particle size distribution as specified hereinabove. For example, the blend may comprise from 50% by weight to 95% by weight, or preferably from 70% by weight to 90% by weight, of a crude platy clay as described herein. In addition, the blend may comprise from about 5% to about 50%, or preferably from about 10% to about 30% by weight of a coarse clay and may have less than 20% by weight less than 0.25 microns. The coarse clay may have greater than 60% by weight, especially greater than 70% by weight greater than 2 microns and may have less than 20%, by weight less than 0.25 microns. The coarse clay may be obtained as the coarse fraction obtained by a particle size separation.

The b-fraction clay component or coarse fraction from a centrifuge operation may be blended with a naturally platy clay and ground to a high shape factor, generally greater than 50. This is helpful to control the <0.25 micron content of the product pigment to the desired level.

According to the present invention in a third aspect there is provided a coating composition for use in producing gloss coatings on paper and other substrates which composition comprises an aqueous suspension of a particulate pigment together with a hydrophilic adhesive or binder, wherein the particulate pigment comprises the pigment product according to the first aspect of the invention.

The pigment product according to the two embodiments of the invention may be used in paper coating as follows.

The clay content of the paper coating composition according to the third aspect of the invention may be greater than 60% by weight, preferably at least 70% of total dry solids, preferably as high as possible but still giving a suitably fluid composition which may be used in coating. The composition may include a dispersing agent, for example up to 2% by weight of a polyelectrolyte based on the dry weight of pigment present. For example, polyacrylates and copolymers containing polyacrylate units are well known as suitable polyelectrolytes.

The pigment product (such as a naturally platy clay or a blend of naturally platy clay and a b-fraction), according to the two embodiments of the first aspect of the invention may be used as the sole pigment in the paper coating composition according to the third aspect, or it may be used in conjunction with one or more other known pigments, such as for example, (commercially available) kaolin, calcined kaolin, natural or precipitated calcium carbonate, titanium dioxide, calcium sulphate, satin white, talc and so called 'plastic pigment'. When a mixture of pigments is used, the pigment product (whether being 100% naturally platy clay or a blend of a naturally platy clay with b-fraction kaolin clay component), according to the two embodiments of the first aspect of the invention is preferably present in the mixture in an amount of at least 80% of the total dry weight of the mixed pigments; however, the skilled artisan can readily modify these amounts under appropriate circumstances to achieve the desired pigment properties.

The binder of the composition according to the third aspect may conveniently comprise an adhesive derived from natural starch obtained from a known plant source, for example, wheat, maize, potato or tapioca although it is not essential to use starch as a binder ingredient. Other binders, which may be used with or without starch, are mentioned later.

Coating application for paper which will be printed by the rotogravure method described earlier, usually employs synthetic binders in the coating composition. Where the coated paper will be printed by the offset method, natural binders described above, like starch, are commonly used. Where starch is employed as a binder ingredient, the starch may be unmodified or raw starch, or it may be modified by one or more chemical treatments known in the art. The starch may, for example, be oxidized to convert some of its —$CH_2OH$ groups to —COOH groups. In some cases the starch may have a small proportion of acetyl, —$COCH_3$, groups. Alternatively, the starch may be chemically treated to render it cationic or amphoteric (having both cationic and anionic charges) The starch may also be converted to starch ether, or hydroxyalkylated starch by replacing some —OH groups with, for example, —$O \cdot CH_2O \cdot CH_2OH$ groups, —$O \cdot CH_2 \cdot CH_3$ groups or —$O \cdot CH_2O \cdot CH_2O \cdot CH_2OH$ groups. A further class of chemically treated starches, which may be used, is that known as the starch phosphates. Alternatively, the raw starch may be hydrolyzed by means of a dilute acid or an enzyme to produce a gum of the dextrin type. The amount of the starch binder used in the composition according to the third aspect is preferably from 4% to 25% by weight, based on the dry weight of pigment. The starch binder may be used in conjunction with one or more other binders, for example synthetic binders of the latex or polyvinyl acetate or polyvinyl alcohol type. When the starch binder is used in conjunction with another binder, such as a synthetic binder, the amount of the starch binder is preferably from 2% to 20% by weight, and the amount of the synthetic binder from 2% to 12% by weight, both based on the weight of dry pigment. Preferably, at least 50% by weight of the binder mixture comprises modified or unmodified starch.

According to the present invention in a fourth aspect there is provided a method of use of the coating composition according to the third aspect which comprises applying the composition to coat a sheet of paper and calendering the paper to form a gloss coating thereon. Preferably, the gloss coating is formed on both sides of the paper.

Calendering is a well known process in which paper smoothness and gloss is improved and bulk is reduced by passing a coated paper sheet between calender nips or rollers one or more times. Usually, elastomer coated rolls are employed to give pressing of high solids compositions. An elevated temperature may be applied. One or more passes through the nips may be applied.

The paper after coating and calendering in the method according to the fourth aspect may have a total weight per unit area in the range 30 $g \cdot m^{-2}$ to 70 $g \cdot m^{-2}$, especially 49 $g \cdot m^{-2}$ to 65 $g \cdot m^{-2}$ or 35 $g \cdot m^{-2}$ to 48 $g \cdot m^{-2}$. The final coating preferably has a weight per unit area preferably from 3 $g \cdot m^{-2}$ to 20 $g \cdot m^{-2}$, especially from 5 $g \cdot m^{-2}$ to 13 $g \cdot m^{-2}$. Such a coating may be applied to both sides of the paper. Thus, the coated paper may be LWC or ULWC paper. The paper gloss may be greater than 45 TAPPI units and the Parker Print Surf value at a pressure of 1mPa of each paper coating may be less than 1 $\mu$m.

The gloss of a coated paper surface may be measured by means of a test laid down in TAPPI Standard No 480 ts-65. The intensity of light reflected at an angle from the surface of the paper is measured and compared with a standard of known gloss value. The beams of incident and reflected light are both at an angle of 75° to the normal to the paper surface. The results are expressed in TAPPI gloss units.

The Parker Print Surf test provides a measure of the smoothness of a paper surface, and comprises measuring the rate at which air under pressure leaks from a sample of the coated paper which is clamped, under a known standard force, between an upper plate which incorporates an outlet for the compressed air and a lower plate, the upper surface of which is covered with a sheet of either a soft or a hard reference supporting material according to the nature of the paper under test. From the rate of escape of the air, a root mean cube gap in $\mu$m between the paper surface and the reference material is calculated. A smaller value of this gap represents a higher degree of smoothness of the surface of the paper under test.

The pigment product of the two embodiments of the first aspect of the invention has been shown to give greater improvement in sheet brightness, opacity, print gloss, and gloss as compared to standard products in starch containing binder systems. However, an improvement may also be obtained where other known starch-free binders are employed (with or without starch present). In each case the adhesive or binder may form from 4% to 30%, and preferably from 8% to 20%, and even more preferably from 8% to 15% by weight of the solids content of the composition. The amount employed will depend upon the composition and the type of adhesive, which may itself incorporate one or more ingredients. For example, hydrophilic adhesives used in the art that incorporate one or more of the following adhesive or binder ingredients may be used in the following stated amounts:

(a) latex: levels range from 4% by weight to 20% by weight. The latex may comprise for example a styrene butadiene, acrylic latex, vinyl acetate latex, or styrene acrylic copolymers.

(b) other binders: levels again range from about 4% by weight to about 20% by weight. Examples of other binders include casein, polyvinyl alcohol and polyvinyl acetate.

Additives in various known classes may, depending upon the type of coating and material to be coated, be included in the coating composition according to the third aspect of the present invention. Examples of such classes of optional additive are as follows:

(a) cross linkers: generally in levels of up to 5% by weight; for example glyoxals, melamine formaldehyde resins, ammonium zirconium carbonates.

(b) water retention aids: generally up to 2% by weight, for example sodium carboxymethyl cellulose, hydroxyethyl cellulose, PVA (polyvinyl acetate), starches, proteins, polyacrylates, gums, alginates, polyacrylamide bentonite and other commercially available products sold for such applications.

(c) viscosity modifiers or thickeners: generally in levels up to 2% by weight; for example polyacrylates, emulsion copolymers, dicyanamide, triols, polyoxyethylene ether, urea, sulphated castor oil, polyvinyl pyrrolidone, montmorillonite, CMC (carboxymethyl celluloses), sodium alginate, xanthan gum, sodium silicate, acrylic acid copolymers, HMC (hydroxymethyl celluloses), HEC (hydroxyethyl celluloses) and others.

(d) lubricity/calendering aids: generally in levels up to 2% by weight, for example calcium stearate, ammonium stearate, zinc stearate, wax emulsions, waxes, alkyl ketene dimer, glycols.

(e) dispersants: generally in levels up to 2 per cent by weight, for example polyelectrolytes such as polyacrylates and copolymers containing polyacrylate species, especially polyacrylate salts (such as sodium and aluminum optionally with a group II metal salt), sodium hexametaphosphates, non-ionic polyol, polyphosphoric acid, condensed sodium phosphate, non-ionic surfactants, alkanolamine and other reagents commonly used for this function.

(f) antifoamers/defoamers: generally in levels up to 1% by weight, for example blends of surfactants, tributyl phosphate, fatty polyoxyethylene esters plus fatty alcohols, fatty acid soaps, silicone emulsions and other silicone containing compositions, waxes and inorganic particulates in mineral oil, blends of emulsified hydrocarbons and other compounds sold commercially to carry out this function.

(g) dry or wet pick improvement additives: generally in levels up to 2% by weight, for example melamine resin, polyethylene emulsions, urea formaldehyde, melamine formaldehyde, polyamide, calcium stearate, styrene maleic anhydride and others.

(h) dry or wet rub improvement and abrasion resistance additives: generally in levels up to 2% by weight, for example glyoxal based resins, oxidized polyethylenes, melamine resins, urea formaldehyde, melamine formaldehyde, polyethylene wax, calcium stearate and others.

(i) gloss-ink hold-out additives: generally in levels up to 2% by weight, for example oxidized polyethylenes, polyethylene emulsions, waxes, casein, guar gum, CMC, HMC, calcium stearate, ammonium stearate, sodium alginate and others.

(j) optical brightening agents (OBA) and fluorescent whitening agents (FWA): generally in levels up to 1% by weight, for example stilbene derivatives.

(k) dyes: generally in levels up to 0.5% by weight.

(l) biocides/spoilage control agents: generally in levels up to 1% by weight, for example metaborate, sodium dodecylbenene sulphonate, thiocyanate, organosulphur, sodium benzonate and other compounds sold commercially for this function such as the range of biocide polymers sold by Calgon Corporation.

(m) levelling and evening aids: generally in levels up to 2% by weight, for example non-ionic polyol, polyethylene emulsions, fatty acid, esters and alcohol derivatives, alcohol/ethylene oxide, sodium CMC, HEC, alginates, calcium stearate and other compounds sold commercially for this function.

(n) grease and oil resistance additives: generally in levels up to 2% by weight, such as oxidized polyethylenes, latex, SMA (styrene maleic anhydride), polyamide, waxes, alginate, protein, CMC, HMC.

(o) water resistance additives: generally in levels up to 2% by weight, such as oxidized polyethylenes, ketone resin, anionic latex, polyurethane, SMA, glyoxal, melamine resin, urea formaldehyde, melamine formaldehyde, polyamide, glyoxals, stearates and other materials commercially available for this function.

(p) insolubiliser: generally in levels up to 2% by weight.

For all of the above additives, the percentages by weight quoted are based on the dry weight of pigment (100%) present in the composition. Where the additive is present in a minimum amount the minimum amount may be 0.01% by weight based on the dry weight of pigment.

The method according to the fourth aspect of the present invention may be carried out in a known way which will depend upon the material to be coated, the coating composition to be applied and other factors as determined by the operator, such as speed and ease of runnability and use of a conventional coating machine.

Methods of coating paper and other sheet materials are widely published and well known. For example, there is a review of such methods published in Pulp and Paper International, May 1994, page 18 et seq. Sheets may be coated on the sheet forming machine. This coating may be "on-machine", or "off-machine" on a coater or coating machine. Use of high solids compositions is desirable in the coating method because it leaves less water to evaporate subsequently. However, as is well known in the art, the solids level should not be so high that high viscosity and leveling problems are introduced.

All known methods of coating according a fourth aspect of the present invention require (i) a means of applying the coating composition to the material to be coated, viz. an applicator; and (ii) a means for ensuring that a correct level of coating composition is applied, viz. a metering device. When an excess of coating composition is applied to the applicator, the metering device is downstream of it. Alternatively, the correct amount of coating composition may be applied to the applicator by the metering device such as a film press. At the points of coating application and metering, the paper web support ranges from a backing roll, such as via one or two applicators, to nothing (just tension). The time the coating is in contact with the paper before the excess is finally removed is the dwell time—and this may be short, long or variable.

The coating is usually added by a coating head at a coating station. According to the quality desired, paper grades are uncoated, single coated, double coated and even triple coated. When providing more than one coat, the initial coat (precoat) may have a cheaper formulation and optionally less pigment in the coating composition. A coater that is applying a double coating, such as a coating on each side of the paper, will have two or four coating heads, depending on the number of sides coated by each head. Most coating heads coat only one side at a time, but some roll coaters (such as a film press, gate roll, size press) coat both sides in one pass.

Examples of known coaters which may be employed in step (b) include air knife coaters, blade coaters, rod coaters, bar coaters, multi-head coaters, roll coaters, roll/blade coaters, cast coaters, laboratory coaters, gravure coaters, kiss coaters, liquid application systems, reverse roll coaters and extrusion coaters.

Embodiments of the present invention will now be described by way of example with reference to the following illustrative Examples.

EXAMPLE 1

This example describes the method and crudes used to produce sample pigments for this application. A naturally platy kaolin clay from Georgia, USA having a shape factor of about 15 and a particle size distribution such that about 60% by weight of the particles had an esd less than 2 microns and about 19% by weight of the particles had an esd less than 0.25 microns was suspended in water. The solids of the kaolin clay in the suspension were 40% solids. The resultant suspension was passed through a high intensity magnetic separator to remove iron-containing impurities therefrom. After the magnetic separation step the kaolin clay slurry was divided into several samples which were then subjected to relatively gentle attrition grinding in a grinding chamber provided with a submerged internal impeller, the speed of rotation of which was insufficient to form a vortex in the suspension contained in the grinding chamber. The grinding medium was a silica sand having grains in the size range from 0.6 to 0.85 mm. The grinding was continued for a time such that the amount of energy dissipated in the suspension for the samples ranged from 20 kWh to 100 kWh per ton of kaolin clay (on a dry weight basis) to produce shape factors for the samples in a range from 35 to 65. After this grinding step, the samples were subjected to a classification step where the particles were made to have particle size distributions such that 85%, 87%, 88% and 92% by weight of the particles had an esd smaller than 2 μm, and a 25% to 45% by weight of the particles had an esd smaller than 0.25 μm. The shape factor of the kaolin clay samples were measured individually by the method described in U.S. Pat. Nos. 5,128,606 and 5,516,617.

The surface area as measured by the BET method was found to range from 12.1 m$^2$/g to 19.7 m$^2$/g.

Example 1 illustrates the manner in which kaolin clay crudes can be processed to obtain a desired kaolin pigment in accordance with the teachings of the invention.

EXAMPLE 2

This example describes the preparation, application and test results of coated paper for rotogravure type of printing. Further samples of a raw kaolin from Georgia, USA were processed similarly to that of Example 1 in accordance with the teachings of the invention and the kaolin product was used as a pigment in a coating composition used for preparing an ULWC for rotogravure printing. The physical properties of the crude kaolin appear in Table 1 below.

TABLE 1

| Physical Property | Value |
| --- | --- |
| Brightness (G.E.) | 80.8 |
| TiO$_2$ | 1.771 |
| Fe$_2$O$_3$ | 0.720 |
| % < 2 microns | 62.1 |
| % < 0.25 micron | 19.6 |
| % < 325 mesh | 1.4 |
| Shape Factor | 23.5 |

The coating composition had the composition shown in Table 2 as follows.

TABLE 2

| Ingredient | Parts By Weight |
| --- | --- |
| Pigment under test | 100 |
| Synthetic latex binder | 6 |
| Lubricant | 1 |
| Dispersant | 0.1 |
| Thickener | 0.2 |
| Adjusted pH with caustic | 8.5 |

The synthetic latex binder was a styrene butadiene rubber binder of the type, which has been found to be suitable for use in rotogravure coating formulations. The parts by weight shown are parts by weight of latex solids.

The lubricant was a calcium stearate of the type which is commonly used in paper coating colors.

The dispersant was a sodium polyacrylate marketed under the trade name "C-211" from Rhone-Poulenc.

The thickener was an alkali swellable acrylic emulsion containing hydrophobic groups and of a type which is found to be suitable for use in rotogravure coating formulations.

Both sides of a base sheet were coated. The coated paper was calendered as described herein above. Both the pigment product physical characteristics and its effect on the physical properties of the coated paper in rotogravure printing are illustrated in Table 3.

TABLE 3

| | Sample A | Sample B | Sample C | Sample D | Sample E (b-fraction blend) | Sample F |
| --- | --- | --- | --- | --- | --- | --- |
| Brightness (G.E.) | 85.3 | 85.7 | 86.5 | 86.6 | 87.7 | 88.6 |
| % <2 | 83.3 | 89.4 | 89.6 | 86.6 | 89.0 | 83.0 |
| % <0.25 | 28.5 | 32.0 | 27.9 | 30.4 | 34.0 | 23.0 |
| Medium Diameter | 0.44 | 0.38 | 0.41 | 0.404 | 0.44 | 0.58 |
| Shape Factor | 41.7 | 44.1 | 60.8 | 52.0 | 58.6 | 35.9 |
| BET (m2/g) | 12.1 | 16.0 | 16.3 | 15.9 | 16.7 | 14.9 |
| Sheet Brightness, ISO | 68.2 | 67.6 | 68.7 | 68.1 | 67.5 | 67.9 |
| Opacity, Printers, % | 88.5 | 87.7 | 88.5 | 88.3 | 88.0 | 87.8 |
| Sheet Gloss (75°), % | 54.2 | 52.6 | 61.0 | 56.1 | 56.7 | 48.8 |
| PPS Porosity, ml/s | 18.4 | 25.2 | 16.0 | 20.4 | 17.3 | 19.5 |
| PPS Roughness, 1000 kPas | 1.24 | 1.40 | 1.09 | 1.17 | 1.14 | 1.23 |
| % Missing Dot | 6.7 | 10.1 | 5.4 | 8.3 | 10.9 | 10.0 |

Samples A through D are kaolin products of a first embodiment of the invention, and Sample E is a kaolin product in accordance with a second embodiment of the invention comprising a blend of 80% by weight of a naturally platy clay and 20% by weight b-fraction kaolin clay-component. The b-fraction component was blended into the naturally platy crude clay after the blunging process. These b-fractions represent the coarse underflow from a centrifuge during the standard production of #1 coating clays.

Sample F is a delaminated product of the prior art. Sample F is a delaminated kaolin clay from Georgia, USA having a particle size distribution such that 81.5% by weight consisted of particles having an esd smaller than 2 μm, 62.5% by weight consisted of particles having an esd smaller than 1.0 μm and 20% consisted of particles having an esd smaller than 0.25 μm. The particle shape factor of the product was 35.9.

The kaolin products, Samples A through E, made in accordance with the embodiments of the invention were compared with the commercially available delaminated product, Sample F. These pigments were each separately made into the composition shown in Table 2 above.

Each composition was coated onto base paper of substance weight 35 g·m$^{-2}$ by means of a coating machine of the type described in GB-A-1032536 fitted with a short dwell time head. The paper speed was 800 m·min$^{-1}$. Samples of a coated paper were prepared at different coat weights in the range of from about 3 g·m$^{-2}$ to about 10 g·m$^{-2}$ The coated paper was dried and then subjected to calendering by passage three times between the rolls of a supercalender at a temperature of 150° C. and a pressure of 200 psi.

The samples of calendered coated paper prepared from each of the coating compositions for the several samples A through F were then tested for sheet gloss; sheet brightness; opacity; Parker Print Surf (PPS) porosity; Parker Print Surf (PPS) roughness using the soft backing material and a pressure of 1000 kPA; and the missing dot test (known to those skilled in the art). The results are set forth in Table 3 above.

From Table 3 is can be seen that the pigments of the invention provide ULWC papers suitable for use in rotogravure printing, which papers generally have improved gloss, brightness, porosity, opacity, and smoothness as compared with a coated paper which has been prepared using the commercially available delaminated pigment which is generally recommended for preparing coated papers of this type. It will be noted, in particular, that commercially available pigment (Sample F) has a particle size distribution which closely resembles that of the pigments of the invention, and it would generally be expected that this pigment of the prior art would have approximately equal performance to that of the pigments in accordance with the invention when used as a pigment in a paper coating composition. However the pigments of the invention, in some instances, are seen to be superior even to this commercially available delaminated pigment. A comparison of performance of Samples B, C and D, which have similar 2 μm contents, but differ significantly in the shape factor, shows that the higher shape factor pigment (C) has 7.5 units higher sheet gloss, about half the missing dots, 1 unit better sheet brightness and opacity than the lowest shape factor pigment (B). The performance of pigment D is intermediate. All the higher shape factor pigments have significantly improved performance over the commercially available delaminated product (F). A comparison of Samples A and B shows that an increase in the 2 micron content does not result in an improvement in sheet properties, if the shape factor remains the same. This result directly demonstrates the need to apply the teachings of the invention to produce a pigment product with the required attributes to obtain an improvement in sheet properties. It takes an increase in shape factor as demonstrated by Samples C, D, and E (the invention) to lead to significantly improved performance.

EXAMPLE 3

This example describes the composition of coating, application and test results of coated paper for offset type of printing application. Samples similar to Example 3, that is Samples A through E (products of the invention) and Sample F (commercially delaminated product) of Example 2 were used in a coating composition used for preparing an ULWC for offset printing. The coating composition had the composition shown in Table 4 as follows:

TABLE 4

| Ingredient | Parts By Weight |
|---|---|
| Pigment under test | 100 |
| Starch | 8 |
| Synthetic latex binder | 8 |
| Lubricant | 1 |
| Dispersant | 0.1 |
| Thickener | 0.1 |
| Adjusted pH with caustic | 8.5 |

The pigments, lubricant, dispersant, and thickener were the same as those used in Example 3. The starch was a preconverted ethylated product of a type which is found to be suitable for use in offset coating formulations.

The synthetic latex binder was a styrene butadiene rubber binder of the type which has been found to be suitable for use in offset coating formulations. The parts by weight shown are parts by weight of latex solids.

The kaolin products, Samples A through F of the invention are compared with the commercially delaminated product (Sample G), and each were separately made into the composition shown in Table 4 above and then applied to a base sheet in offset printing in a manner similar to that described in Example 2.

The samples of calendered coated paper prepared from each of the eight coating compositions were then tested for sheet brightness, opacity, sheet gloss, PPS porosity and smoothness, and print gloss using the methods described hereinabove.

The physical properties of the pigment product used in the coating compositions and the properties of the paper coated with these pigment products are shown in Table 5.

TABLE 5

|  | Sample A | Sample B | Sample C | Sample D | Sample E | Sample F (b-Fraction Blend) | Sample G |
|---|---|---|---|---|---|---|---|
| Brightness (G.E.) | 85.3 | 85.7 | 86.5 | 86.6 | 86 | 87.7 | 88.6 |
| % <2 | 83.3 | 89.4 | 89.6 | 88.6 | 85 | 89.0 | 83.0 |
| % <0.25 | 28.5 | 32.0 | 27.9 | 30.4 | 31 | 34.0 | 23.0 |
| Median Particle Size | 0.44 | 0.38 | 0.411 | 0.404 | 0.415 | 0.44 | 0.58 |
| Shape Factor | 41.7 | 44.1 | 60.8 | 52.0 | 51 | 58.6 | 35.9 |
| BET (m2/g) | 12.1 | 16.0 | 16.3 | 15.9 | 16 | 16.7 | 14.9 |
| Sheet Brightness, ISO | 66.0 | 66.2 | 66.4 | 66.0 | 66 | 65.6 | 65.3 |

TABLE 5-continued

|  | Sample A | Sample B | Sample C | Sample D | Sample E | Sample F (b-Fraction Blend) | Sample G |
|---|---|---|---|---|---|---|---|
| Opacity, Printers, % | 87.6 | 87.7 | 87.9 | 87.4 | 87 | 87.2 | 57.1 |
| Sheet Gloss (75 0), % | 45.6 | 49.0 | 54.7 | 49.7 | 47 | 51.9 | 43.2 |
| PPS Porosity (ml/min) | 5.0 | 5.3 | 4.5 | 4.9 | 5 | 4.5 | 5.4 |
| PPS Roughness, 1000 kPas | 1.25 | 1.26 | 1.14 | 1.20 | 1.25 | 1.18 | 1.26 |
| Print Gloss | 64.2 | 68.1 | 70.8 | 66.4 | 64 | 71.6 | 62.9 |

It can be seen from Table 5 that the pigments of the invention provide ULWC papers suitable for use in offset printing. Compared to the commercial delaminated clay all the pigments have significantly improved sheet brightness, opacity, sheet gloss, print gloss and smoothness. Samples B, C and D have similar 2 μm content with significantly different shape factors. It is clearly seen that the highest shape factor pigment(C) has up to 5 units higher sheet gloss compared to the sample with the lower shape factor (B). Samples B, C and D have significantly higher sheet gloss compared to Sample G, which is the commercial delaminated clay sample. The samples with better sheet gloss also have better print gloss. Sample A which has similar 2 μm content, higher 0.25 μm content, and higher shape factor as compared to the commercial delaminated clay (Sample G), has 2.5 units higher sheet gloss and print gloss. This comparison demonstrates that clay produced according to the teachings of the invention still outperform commercially available delaminated clay. Sample F made from the second preferred pigment, also has improved behavior similar to Sample C. A comparison of Samples A and E which have similar 2 μm and 0.25 μm contents but a different shape factor, shows that the higher shape factor pigment of Sample E has improved performance.

What is claimed is:

1. A pigment product for a paper coating composition, said pigment product comprising a particulate kaolin processed from a naturally platy clay having a shape factor of at least 15, said pigment product having particles with a particle size distribution such that at least 85% by weight of the particles have an equivalent spherical diameter less than 2 μm and not more than 35% by weight of the particles have an esd less than 0.25 μm and whose particles have a shape factor of at least 50, and wherein said pigment product further comprises a b-fraction component having a shape factor less than 15 and having particles with a particle size distribution such that less than 50% by weight have an esd less than 2 μm and less than 20% by weight have an esd less than 0.25 μm.

2. A pigment product according to claim 1 wherein said processed particulate kaolin is processed from a crude comprising a blend including both a naturally platy clay crude with a shape factor greater than 15 and said b-fraction having a shape factor less than 10.

3. A pigment product according to claim 2 wherein said naturally platy clay crude has a particle size distribution such that greater than 50% by weight of the particles have an esd less than 2 μm and less than 25% by weight of the particles nave an esd less than 0.25 μm.

4. A pigment product according to claim 2 wherein said blend has a particle size distribution such that greater than 50% by weight of the particles have an esd less than 2 μm and less than 25% by weight of the particles have an esd less than 0.25 μm.

5. A pigment product for a paper coating composition, said pigment product comprising a particulate kaolin processed from a naturally platy clay having a shape factor of at least 15, said pigment product having particles with a particle size distribution such that at least 85% by weight of the particles have an equivalent spherical diameter less than 2 μm and not more than 35% by weight of the particles have an esd less than 0.25 μm and whose particles have a shape factor of at least 60.

6. A pigment product for a paper coating composition, said pigment product comprising a particulate kaolin processed from a naturally platy clay having a shape factor of at least 15, said pigment product having particles with a particle size distribution such that between about 87% to about 92% by weight of the particles have an esd less than 2 μm, and between about 20% to about 35% by weight of the particles have an esd less than 0.25 μm and whose particles have a shape factor of at least 50.

7. A pigment product for a paper coating composition, said pigment product comprising a particulate kaolin processed from a naturally platy clay having a shape factor of at least 15, said pigment product having particles with a particle size distribution such that at least 85% by weight of the particles have an equivalent spherical diameter less than 2 μm and not more than 35% by weight of the particles have an esd less than 0.25 μm and whose particles have a shape factor of at least 55.

8. A method of producing a pigment product suitable for use in a coating composition to provide a gloss coating on paper, the method comprising:
    mixing a raw kaolin clay crude, comprising a blend of a naturally platy clay having a shape factor of at least 15 and a b-fraction clay component having a shape factor less than 10 to produce a particle size distribution such that greater than 50% by weight of the particles have an esd less than 2 μm and not more than 25% by weight of the particles have an esd less than 0.25 μm, with water to form an aqueous suspension containing from about 20% to about 70% of kaolin on a dry weight basis;
    diluting the aqueous suspension to 40% of kaolin on a dry weight basis then subjecting the suspension produced to attrition grinding using a particulate grinding medium for a time sufficient to dissipate in the suspension an optimum amount of energy to impart an average shape factor to the kaolin clay particles of at least 50;
    separating the aqueous suspension of ground kaolin clay from the particulate grinding medium;

classifying particles in the aqueous suspension by size; and dewatering the aqueous suspension to recover said pigment product thereof.

9. A method according to claim 8 wherein the crude is initially crushed and then mechanically worked by blunging in water.

10. A method according to claim 9, wherein the water contains an inorganic or organic clay dispersant.

11. A method according to claim 10 wherein said clay dispersant is a mixture of sodium hexametaphosphate and soda ash.

12. A method according to claim 9, wherein the solids of the blunged clay are from 20% to 65% by weight of kaolin on a dry weight basis.

13. A method according to claim 9, wherein the solids of the blunged clay are from 40% to 60% by weight of kaolin on a dry weight basis.

14. A method according to claim 8 wherein prior to or after the attrition grinding, one or more beneficiation processes are performed on the clay suspension or slurry.

15. A method according to claim 14 wherein said beneficiation processes are chosen from magnetic separation, ozone, reduced-acid leaching, flotation, selective flocculation, and combinations thereof.

16. A method according to claim 8, further comprising degritting the clay slurry prior to diluting the aqueous suspension to remove coarse particles greater than 45 microns and subjecting the clay slurry to a high intensity magnetic separator to remove the iron-bearing minerals from the clay.

17. A method according to claim 8, wherein the shape factor of the naturally platy clay is greater than 25.

18. A method according to claim 8, wherein the shape factor of the naturally platy clay is greater than 30.

19. A method according to claim 8, wherein the energy dissipated during grinding is between about 20 kWh to about 100 kWh of energy per ton of kaolin present on a dry weight basis.

20. A method according to claim 8, wherein the energy dissipated during grinding is between about 25 kWh to about 50 kWh of energy per ton of kaolin present on a dry weight basis.

21. A method according to claim 8, wherein the specific gravity of the particulate grinding medium is 2 or more.

22. A method according to claim 8, wherein the particulate grinding medium comprises grains of silica sand having diameters not larger than about 2 mm and not smaller than about 0.25 mm.

23. A method according to claim 8, wherein, after said particle size classification, the kaolin clay particles have a particle size distribution such that at least 80% of the particles have an esd less than 2 $\mu$m.

24. A method according to claim 8 wherein, after said particle size classification, the kaolin clay particles have a particle size distribution such that from 85% to 95% of the particles have an esd less than 2 $\mu$m.

25. A method according to claim 8, wherein, after said particle size classification, the kaolin clay particles have a particle size distribution such that from 88% to 92% of the particles have an esd less than 2 $\mu$m.

26. A method according to claim 8, wherein the resulting pigments have a particle size distribution of at least 58% by weight finer than 0.5 $\mu$m.

27. A method according to claim 8, wherein the resulting pigments have a particle size distribution of from 50% to 60% by weight finer than 0.5 $\mu$m.

28. A method according to claim 8, wherein the resulting pigments have a particle size distribution of from 53% to 58% by weight finer than 0.5 $\mu$m.

29. A method according to claim 8, wherein the resulting pigments have a particle size distribution of at least 38% by weight finer than 0.3 $\mu$m.

30. A method according to claim 8, wherein, after the particle size classification, the kaolin clay particles have a particle size distribution such that less than 35% of the particles have an esd less than 0.25 $\mu$m.

31. A method according to claim 8, wherein after said particle size classification, the kaolin clay particles have a particle size distribution such that from about 20% to 35% of the particles have an esd less than 0.25 $\mu$m.

32. A method according to claim 8, wherein after said particle size classification, the kaolin clay particles have a particle size distribution such that from about 25% to 35% of the particles have an esd less than 0.25 $\mu$m.

33. A method according to claim 8, wherein the resulting pigments have an average particle size from about 0.30 to about 0.60 $\mu$m.

34. A method according to claim 8, wherein the resulting pigments have an average particle size from about 0.35 to about 0.52 $\mu$m.

35. A method according to claim 8, wherein the resulting pigments have an average particle size from about 0.38 to about 0.45 $\mu$m.

36. The method according to claim 8, further comprising, prior to said dewatering, subjecting the suspension to a leaching process to remove iron oxides and other leachable colorant species to change the shade of the clay.

37. The method according to claim 8, wherein after dewatering, the solids content of the slurry is raised to about 60% by weight.

38. A coating composition for use in producing gloss coatings on paper and other substrates, which composition comprises an aqueous suspension of a particulate pigment together with a hydrophilic adhesive, wherein the particulate pigment comprises a pigment product according to claim 2.

39. A method of producing a gloss coating on paper, comprising applying the coating composition of claim 8, to coat a sheet of paper and calendaring the paper to form a gloss coating thereon.

40. A pigment product for a paper coating composition, said pigment product comprising a particulate kaolin processed from a naturally platy clay having a shape factor of at least 15, said pigment product having particles with a particle size distribution such that at least 85% by weight of the particles have an equivalent spherical diameter less than 2 $\mu$m and not more than 35% by weight of the particles have an esd less than 0.25 $\mu$m and whose particles have a shape factor of at least 50 and a surface area greater than 12 m$^2$/g when measured by the BET method.

41. A method of making a pigment product for a paper coating composition comprising:

providing a source of naturally platy clay, which is from a sedimentary deposit and has particle size distribution such that greater than 50% by weight of the particles have an esd less than 2 $\mu$m and not more than 25% by weight of the particles have an esd less than 0.25 $\mu$m;

forming a kaolin pigment having particles with a particle size distribution such that at least 85% by weight of the particles have an equivalent spherical diameter less than 2 $\mu$m and not more than 35% by weight of the particles have an esd less than 0.25 $\mu$m and whose particles have a shape factor of at least 50;

wherein said forming comprises:
  initially crushing the crude then mechanically working the crude by blunging in water;
  mixing said naturally platy clay with water to form an aqueous suspension containing from 20% to about 70% of kaolin on a dry weight basis;
  diluting the aqueous suspension to about 40% of kaolin on a dry weight basis and then subjecting the aqueous suspension to attrition grinding using a particulate grinding medium for a time sufficient to dissipate in the aqueous suspension an optimum amount of energy to impart an average shape factor to the kaolin clay particles of at least 50;
  separating the aqueous suspension of ground kaolin clay from the particulate grinding medium;
  classifying particles in the aqueous suspension by size; and
  dewatering the aqueous suspension to recover said pigment product thereof.

42. A method of making a pigment product for a paper coating composition comprising:
  providing a source of naturally platy clay, which is from a sedimentary deposit and has particle size distribution such that greater than 50% by weight of the particles have an esd less than 2 μm and not more than 25% by weight of the particles have an esd less than 0.25 μm;
  forming a kaolin pigment having particles with a particle size distribution such that at least 85% by weight of the particles have an equivalent spherical diameter less than 2 μm and not more than 35% by weight of the particles have an esd less than 0.25 μm and whose particles have a shape factor of at least 50;
  wherein said forming comprises:
    mixing said naturally platy clay with water to form an aqueous suspension containing from 20% to about 70% of kaolin on a dry weight basis;
    degritting the aqueous suspension to remove coarse particles greater than 45 μm and subjecting the clay slurry to a high intensity magnetic separator to remove the iron-bearing minerals from the clay;
    diluting the aqueous suspension to about 40% of kaolin on a dry weight basis and then subjecting the aqueous suspension to attrition grinding using a particulate grinding medium for a time sufficient to dissipate in the aqueous suspension an optimum amount of energy to impart an average shape factor to the kaolin clay particles of at least 50;
    separating the aqueous suspension of ground kaolin clay from the particulate grinding medium;
    classifying particles in the aqueous suspension by size; and
    dewatering the aqueous suspension to recover said pigment product thereof.

43. A method of making a pigment product for a paper coating composition comprising:
  providing a source of naturally platy clay, which is from a sedimentary deposit and has particle size distribution such that greater than 50% by weight of the particles have an esd less than 2 μm and not more than 25% by weight of the particles have an esd less than 0.25 μm;
  forming a kaolin pigment having particles with a particle size distribution such that at least 85% by weight of the particles have an equivalent spherical diameter less than 2 μm and not more than 35% by weight of the particles have an esd less than 0.25 μm and whose particles have a shape factor of at least 50;
  wherein said forming comprises:
    mixing said naturally platy clay with water to form an aqueous suspension containing from 20% to about 70% of kaolin on a dry weight basis;
    diluting the aqueous suspension to about 40% of kaolin on a dry weight basis and then subjecting the aqueous suspension to attrition grinding using a particulate grinding medium, wherein the specific gravity of the particulate grinding medium is 2 or more, for a time sufficient to dissipate in the aqueous suspension an optimum amount of energy to impart an average shape factor to the kaolin clay particles of at least 50;
    separating the aqueous suspension of ground kaolin clay from the particulate grinding medium;
    classifying particles in the aqueous suspension by size; and
    dewatering the aqueous suspension to recover said pigment product thereof.

44. A method according to claim 43, wherein the particulate grinding medium comprises grains of silica sand having diameters not larger than about 2 mm and not smaller than about 0.25 mm.

45. A method of making a pigment product for a paper coating composition comprising:
  providing a source of naturally platy clay, which is from a sedimentary deposit and has particle size distribution such that greater than 50% by weight of the particles have an esd less than 2 μm and not more than 25% by weight of the particles have an esd less than 0.25 μm;
  forming a kaolin pigment having particles with a particle size distribution such that at least 85% by weight of the particles have an equivalent spherical diameter less than 2 μm and not more than 35% by weight of the particles have an esd less than 0.25 μm and whose particles have a shape factor of at least 50 and an average particle size from about 0.30 to about 0.60 μm;
  wherein said forming comprises:
    mixing said naturally platy clay with water to form an aqueous suspension containing from 20% to about 70% of kaolin on a dry weight basis;
    diluting the aqueous suspension to about 40% of kaolin on a dry weight basis and then subjecting the aqueous suspension to attrition grinding using a particulate grinding medium for a time sufficient to dissipate in the aqueous suspension an optimum amount of energy to impart an average shape factor to the kaolin clay particles of at least 50;
    separating the aqueous suspension of ground kaolin clay from the particulate grinding medium;
    classifying particles in the aqueous suspension by size; and
    dewatering the aqueous suspension to recover said pigment product thereof.

46. A method according to claim 45, wherein the resulting pigments have an average particle size from about 0.35 to about 0.52 μm.

47. A method according to claim 45, wherein the resulting pigments have an average particle size from about 0.38 to about 0.45 μm.

48. A method of making a pigment product for a paper coating composition comprising:
  providing a source of naturally platy clay, which is from a sedimentary deposit and has particle size distribution such that greater than 50% by weight of the particles have an esd less than 2 μm and not more than 25% by weight of the particles have an esd less than 0.25 μm;
  forming a kaolin pigment having particles with a particle size distribution such that at least 85% by weight of the particles have an equivalent spherical diameter less than 2 μm and not more than 35% by weight of the particles have an esd less than 0.25 μm and whose particles have a shape factor of at least 50;

wherein said forming comprises:

mixing said naturally platy clay with water to form an aqueous suspension containing from 20% to about 70% of kaolin on a dry weight basis;

diluting the aqueous suspension to about 40% of kaolin on a dry weight basis and then subjecting the aqueous suspension to attrition grinding using a particulate grinding medium for a time sufficient to dissipate in the aqueous suspension an optimum amount of energy to impart an average shape factor to the kaolin clay particles of at least 50;

separating the aqueous suspension of ground kaolin clay from the particulate grinding medium;

classifying particles in the aqueous suspension by size;

dewatering the aqueous suspension to recover said pigment product thereof; and raising the solids content of the aqueous suspension to about 60% by weight.

* * * * *

UNITED STATES PATENT AND TRADEMARK OFFICE
CERTIFICATE OF CORRECTION

PATENT NO. : 6,537,363 B1  
DATED : March 25, 2003  
INVENTOR(S) : Golley et al.

It is certified that error appears in the above-identified patent and that said Letters Patent is hereby corrected as shown below:

Column 17,  
Line 65, "nave" should read -- have --.

Column 19,  
Lines 5, 19 and 54, "claim 8" should read -- claim 8, --.  
Line 10, "claim 10" should read -- claim 10, --.  
Line 22, "claim 14" should read -- claim 14, --.

Column 20,  
Line 42, "claim 8," should read -- claim 38 --.

Signed and Sealed this

Fourth Day of November, 2003

JAMES E. ROGAN  
*Director of the United States Patent and Trademark Office*

UNITED STATES PATENT AND TRADEMARK OFFICE
CERTIFICATE OF CORRECTION

PATENT NO. : 6,537,363 B1
DATED : March 25, 2003
INVENTOR(S) : Golley et al.

It is certified that error appears in the above-identified patent and that said Letters Patent is hereby corrected as shown below:

Column 2,
Line 64, "5,516,617" should read -- 5,576,617 --.

Signed and Sealed this

Twenty-second Day of November, 2005

JON W. DUDAS
*Director of the United States Patent and Trademark Office*